No. 873,689. PATENTED DEC. 10, 1907.
W. H. VAN WINKLE.
APPARATUS FOR TAPPING MAINS.
APPLICATION FILED OCT. 30, 1905.

Witnesses:
Jas. F. Coleman
John Foster

Inventor
Walter H. Van Winkle
By Dyer & Dyer
Attorneys.

UNITED STATES PATENT OFFICE.

WALTER H. VAN WINKLE, OF NEWARK, NEW JERSEY.

APPARATUS FOR TAPPING MAINS.

No. 873,689.   Specification of Letters Patent.   Patented Dec. 10, 1907.

Application filed October 30, 1905. Serial No. 284,943.

*To all whom it may concern:*

Be it known that I, WALTER H. VAN WINKLE, a citizen of the United States, residing at Newark, in the county of Essex and State of New Jersey, have invented a certain new and useful Apparatus for Tapping Mains, of which the following is a description.

The object of my invention is to produce a sleeve for tapping machines for tapping water mains and the like, and making branch connections therewith without withdrawing the pressure from such mains, which will be more effective and more economical in use.

Figure 1:
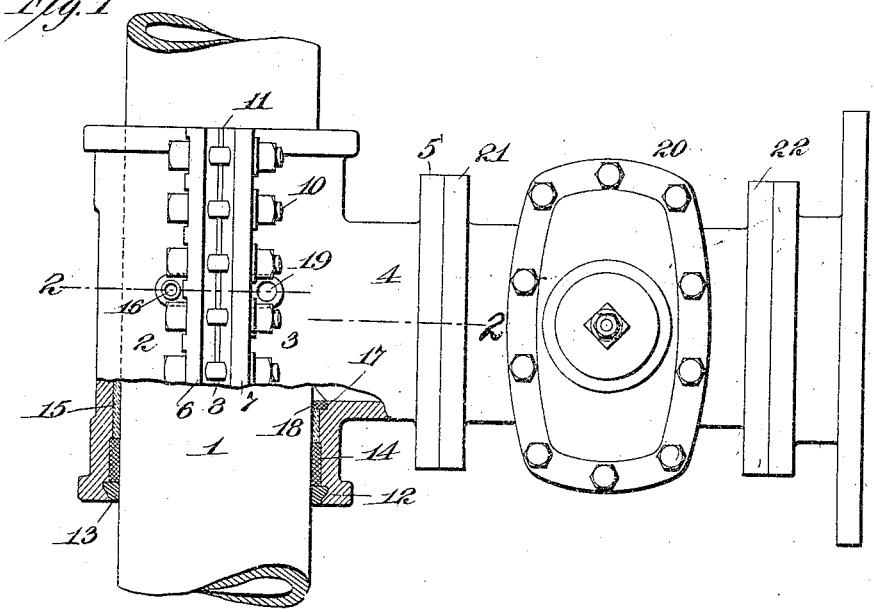
Figure 2:
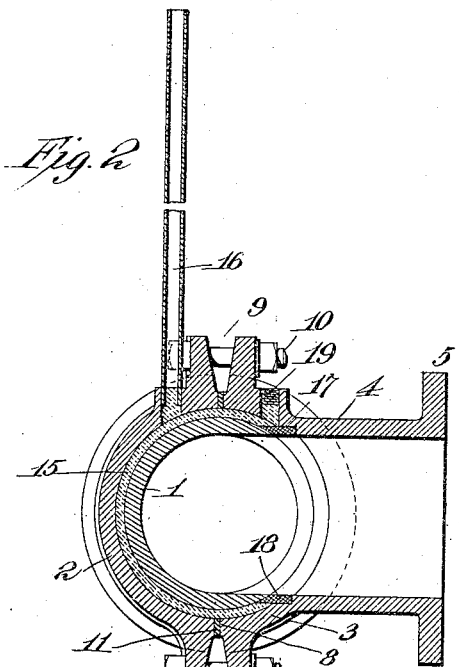

In the accompanying drawing Figure 1 is a top view showing the tapping machine applied for making the branch connection, the sleeve being in sections at one end, and Fig. 2 is a vertical section through a portion of the apparatus.

In both of the views like parts are designated by the same reference characters.

1 is the main or pipe which contains the water or other fluid under pressure, and which it is desired to provide with a branch connection without withdrawing the pressure from the main or disturbing the flow of the fluid therethrough. The sleeve is composed of two halves 2—3, one of which is provided with a branch coupling 4 having a flange 5, to which the branch valve casing is bolted. The parts 2—3 of the sleeve are provided with flanges 6—7, which have narrow meeting or abutting surfaces 8 at their inner ends and are beveled outwardly beyond this point on their inner surfaces so as to form V-shaped gaps 9 between the flanges. Between these flanges pass bolts 10 for clamping the flanges together, and between the narrow or abutting surfaces 8 are placed strips 11 of lead or other suitable material. The lead strips 11 are placed between the surfaces 8 and the two parts of the sleeve are drawn together by the bolts 10, squeezing the strips 11 and making tight joints between the two halves of the sleeve. The abutting surfaces 8 it will be understood are planed or otherwise finished. By making these surfaces narrow the pressure exerted by the clamping bolts is concentrated upon the relatively narrow strips and hence a better joint is formed. The surfaces 8 are planed surfaces, so that the lead strip may be driven in against the main by a suitable calking tool if desired. The sleeve is slightly larger than the main 1, having, however, a cylindrical form like that of the main with only a slight separation between the main and the interior bore of the sleeve. The ends of the cylindrical sleeve are provided with calking hubs 12 having calking grooves on the inner side for receiving between the hub and main 1 suitable calkings 13. This calking at the end of the hubs makes a permanent and tight connection between the main and the sleeve at its ends so as to prevent leakage. It has been usual heretofore to provide a against leakage between the cylinder sleeve and the main by filling the space between the sleeve and the main throughout its length with a lead filling upon which the sleeve is clamped, relying upon securing a tight joint between the sleeve and the main around the opening of the branch coupling. Such a joint, however, is imperfect and expensive to make, especially in the case of sleeves for mains of large size.

In lieu of the lead packing extending through the entire length of the sleeve I provide a filling or tamping 14 of oakum or other suitable material, which extends from the base of the calking 13 a sufficient distance inward to form a dam or backing for the calking 13. The space around the sleeve and between the filling 14 may be filled with cement or other suitable material 15. This cement may be introduced in the liquid form, by means of the pipe 16, extending through one of the parts of the sleeve. This pipe may be of sufficient length to secure an adequate pressure of cement within the sleeve. To prevent escape of the cement through the branch coupling 4 the edge of the latter is formed with a groove 17 within which may be placed a tamping of oakum or other suitable material 18. An opening or vent 19 permits escape of air from the interior of the sleeve.

In tapping a main with my improved device the sleeve which is slightly larger than the main has its separated halves brought together in the desired position upon the main to give the branch connection its proper direction. The separate halves are secured together by the bolts passing through the diverging flanges with the surfaces 8 upon the strips 11. These strips 11 may be driven against the side of the main by a suitable calking tool if desired. The tampings 14 and 18 may be inserted if desired before the parts are assembled. The hubs at the ends of the sleeve are then calked with lead and the liquid cement is run in through the pipe 16. This may be poured in until it begins to escape through the vent 19, whereupon the vent is closed by a plug and the supply of cement is continued until the pipe 16 is filled. The length of the pipe 16 will determine the pressure of the cement within the sleeve; by making it 32 inches long a pressure of about a pound to the inch will be secured. When the sleeve is secured to the main, the valve casing 20 is secured to the flange 5, on the branch connection by means of a flange 21 and a tapping machine of the ordinary type is secured to the flange 22 at the other end of the valve casing. The pipe is then tapped in the well known manner by means of a saw which cuts a disk out of the side of the pipe, the piece removed from the side of the pipe being withdrawn with the tapping machine. The saw and bit of the tapping machine are then withdrawn and the valve is closed shutting off the escape of the water upon the removal of the tapping machine. The tapping machine is then unbolted from the flange 22 of the valve casing and the branch pipe is run off from the valve casing.

Having now described my invention what I claim as new and desire to secure by Letters Patent is:

1. A sleeve for tapping machines having a cylindrical form conforming to the shape of the main and slightly larger than the main, said sleeve being divided into longitudinal parts having diverging flanges adjacent to the dividing edges, and with inset and narrow plane abutting surfaces and calking strips, the said strips lying between the abutting surfaces, bolts connecting the diverging flanges, the said bolts passing through the flanges outside of the abutting surfaces, the location of the bolts being considerably outside of the abutting surfaces whereby the strips may be the more effectually compressed between such surfaces, and the plane character of the surfaces permitting the strips to be calked against the main.

2. A sleeve for tapping machines having a cylindrical form conforming to the shape of the main and slightly larger than the main, and having a branch pipe connected thereto, calking hubs on the extremities of the sleeve, the said hubs having calking grooves on the inner side, tamping strips adjacent to the branch pipe, a tamping strip adjacent to each end of the sleeve and inside of the calking groove, a lead calking within each groove and outside of the last named tamping strip and a filling of cement between the sleeve and the main, the said filling occupying the space between tamping strips.

This specification signed and witnessed this 3rd day of October, 1905.

WALTER H. VAN WINKLE.

Witnesses:
LEONARD H. DYER,
JNO. ROBT. TAYLOR.